United States Patent [19]

Watanabe et al.

[11] Patent Number: 5,045,224

[45] Date of Patent: Sep. 3, 1991

[54] COLOR-CHANGE WASHING SOLUTION, SUITABLE FOR SPRAY COATING DEVICES

[75] Inventors: Ikuo Watanabe, Toyota; Toshio Kai, Okazaki; Gen Kusunoki, Nagoya; Shiro Oota, Aichi, all of Japan

[73] Assignee: Toyota Jidosha Kabushiki Kaisha, Japan

[21] Appl. No.: 295,708

[22] Filed: Jan. 11, 1989

[30] Foreign Application Priority Data

Jan. 12, 1988 [JP] Japan .................................. 63-3050

[51] Int. Cl.$^5$ .......................... C11D 7/50; C11D 7/24; C11D 7/26; C11D 7/60
[52] U.S. Cl. .................................... 252/162; 252/170; 252/364; 252/DIG. 8
[58] Field of Search ................................ 252/162–172, 252/DIG. 8, 364

[56] References Cited

U.S. PATENT DOCUMENTS

| | | | |
|---|---|---|---|
| 2,937,111 | 5/1960 | Leithauser | 134/38 |
| 3,475,343 | 10/1969 | Kusama et al. | 252/364 |
| 3,737,386 | 6/1973 | Geiss et al. | 252/162 |
| 4,483,783 | 11/1984 | Alkanese | 252/312 |
| 4,673,524 | 6/1987 | Dean | 252/118 |
| 4,780,235 | 10/1988 | Jackson | 252/170 |
| 4,812,255 | 3/1989 | Suwala | 252/142 |

FOREIGN PATENT DOCUMENTS

63-4879  1/1988  Japan .

Primary Examiner—Paul Lieberman
Assistant Examiner—A. Beadles-Hay
Attorney, Agent, or Firm—Finnegan, Henderson, Farabow, Garrett & Dunner

[57] ABSTRACT

A washing solution for a color-change washing which contains a medium-boiling and/or high-boiling true solvent having a boiling point of 100° C. or more, and a color-change washing method using that washing solution. In rotary type electrostatic spray coating devices in which a non-aqueous dispersion paint and a titanium dioxide pigment-incorporated paint are used in combination, the washing solution and method are advantageously used as they remove contamination and clogging of the coating device and reduce fire hazards.

1 Claim, 4 Drawing Sheets

Fig. 5  EVALUATION OF CONTAMINATION

| CLASS | SKETCH OF PAINT NOZZLE | COMMENTS |
|---|---|---|
| A |  | NO CONTAMINATION WAS OBSERVED. |
| B |  | OPENING END OF THE NOZZLE WAS SLIGHTLY CONTAMINATED. |
| C |  | WHOLLY CONTAMINATED. PARTICULARLY, OPENING END OF THE NOZZLE. |

Fig. 6
CONTAMINATION AND AMOUNT OF TRUE SOLVENT

Fig. 7
CONTAMINATION AND AMOUNT OF TRUE SOLVENT

COLOR-CHANGE WASHING SOLUTION, SUITABLE FOR SPRAY COATING DEVICES

BACKGROUND OF THE INVENTION

1. Field of the Invention

The present invention relates to a washing technology. More particularly, the present invention relates to a washing solution and method of washing away paint residue when a color to be coated is different to a color previously coated, (hereinafter, color-change washing). Particularly, this washing solution and method can be advantageously used when automobile bodies and other articles are to be successively coated with different color paints by a rotary type electrostatic spray coating device.

2. Description of the Related Art

As is well-known, an electrostatic spray coating technology is widely used in the spray coating of automobile bodies and other products, and typically, a rotary type electrostatic spray coating device is used in such a technology or process. In this type of spray coating device, if a color-change coating is carried out, i.e., if two or more paints of different colors are successively coated on the same article to provide an attractive appearance, conventionally a spray head of the coating device is washed with a suitable washing solution or thinner after completion of a coating using a paint of a first color and before a next coating using a paint of a second color. This washing step is referred to herein as color-change washing, and effectively removes a film or particles of the first color paint from the spray head to which the paint is adhered, to thereby prevent contamination of the coating device due to the paint used. Generally, the washing solution or thinner used in this color-change washing is a mixed solvent and comprises a true solvent, an assistant solvent, a diluent and, optionally, other components or additives Examples of the true solvents conventionally used in this field include low-boiling ketones having a boiling point of less than 100° C., for example, acetone (b.p. 81° C.), methyl ethyl ketone (b.p. 79.6° C.) and the like; and medium-boiling esters and glycol ethers having a boiling point of from 100° C. to less than 150° C. Typical examples of the assistant solvents used in combination with said true solvents include alcohols such as methyl alcohol, ethyl alcohol and the like. In addition, typical examples of the diluents used include medium-boiling hydrocarbons having a boiling point of from 100° C. to less than 150° C., for example, toluene (b.p. 110.7° C.) and xylene (b.p. ca 140° C.). These solvent components may be mixed indifferent proportions in accordance with various factors such as the requirements defined in the U.S. E.P.A. Regulation related to the use of organic solvents and the fields of utilization of the washing solution.

Bodies of automobiles are often coated with a metallic paint having aluminum or other metal powders incorporated therein, to improve the appearance of the coated bodies. For this metallic coating, a non-aqueous dispersion paint, also referred to as an NAD paint, is used in combination with a titanium dioxide pigment incorporated paint. The NAD paint is a relatively low viscosity dispersion or suspension of a high concentration of polymeric resins such as acrylic resin having a relatively high molecular weight, in a suitable non-polar organic solvent, and is used to form a clear coating. Compared with conventional solvent type paints, this paint has many advantages, such as low environmental pollution, saving in raw materials, formation of thicker coatings, and an improved operability of the coating process. The titanium dioxide pigment-containing paint is used to form a white-colored coating, but when the NAD and titanium dioxide pigment-containing paints are used separately for color-change painting in a rotary type electrostatic spray coating device, and the washing solution or thinner is used for the color-change washing, a serious problem arises due to the use of this washing solution. Namely, assuming that a solvent selected from the group of true solvents is a good solvent for the NAD paint and is used in the washing solution, the selected solvent can dissolve, swell and thicken the NAD paint during a color-change washing of a spray head and other parts of the coating device with the washing solution, after completion of the NAD coating. As a result, the thickened NAD paint acts as an adhesive and adheres to the spray head, paint nozzles, pipes and other parts of the coating device, to thereby coagulate titanium dioxide pigments therein. The titanium dioxide pigments are derived from the white-colored paint which is sprayed after the color-change washing, and a coagulation of such pigments can eventually cause problems such as a serious contamination and clogging of the coating device.

The contamination and clogging of the coating device is a serious problem, and to solve this problem. the present inventors have created an improved solution for washing the coating device. This washing solution, as disclosed in Japanese Unexamined Patent Publication (Kokai) No. 63-4879, published Jan. 9. 1988, comprises a true solvent an assistant solvent and a diluent as main components, and is characterized in that a good solvent to the NAD paint is not included or is included only in a negligible amount in the washing solution, but an amount of the solvents in which the NAD paint is insoluble is increased. This washing solution ensures that the NAD paint is washed from the coating device during a color-change washing, and thus the problems of contamination and clogging of the coating device are completely resolved.

Further, a recent study revealed that the problem of coagulation of the titanium dioxide pigments in the spray head and paint nozzles in the coating device due to the adhesive property of the thickened NAD paint is also caused because of the boiling point of the solvents used in the washing solution, in addition to the use of the good solvent to the NAD paint as described in the above paragraphs. Namely, the low-boiling Ketones used as the true solvent in the washing solution have a rapid drying property, and therefore, the NAD paint dissolved therein during color-change washing adheres to the spray head and paint nozzles prior to the washing of the same from the coating device. Also, such low-boiling Ketones must be handled with care, because of the danger of a combustion thereof due to a low flash point of the Ketones of less than about 0° C.

SUMMARY OF THE INVENTION

An object of the present invention is to provide an improved washing solution or thinner for a color-change washing which fully satisfies the requirements of the U.S. California VOC Regulation, completely washes off a non-aqueous dispersion or NAD paint from a coating device when the device is washed with the washing solution, and ensures a high level of safety with regard to fire and other hazards.

Another object of the present invention is to provide an improved washing method for a color-change washing of a rotary type electrostatic spray coating device.

According to the present invention, there is provided a washing solution for a color-change washing of a rotary type electrostatic spray coating device in which a non-aqueous dispersion (NAD) paint and a titanium dioxide pigment-incorporated paint are used in combination for a color-change painting, which solution contains a medium-boiling and/or high-boiling true solvent having a boiling point of 100° C. or more.

According to the present invention, there is also provided a method of color-change washing of a rotary type electrostatic spray coating device, which comprises the steps of:

spray coating an article with a non-aqueous dispersion paint to form a clear coating, color-change washing a spray head and paint nozzle of the spray coating device with a washing solution which contains a medium-boiling and/or high-boiling true solvent having a boiling point of 100° C. or more, to wash remaining dispersion paint from said spray head and paint nozzle, and spray coating an or another article with a titanium dioxide pigment-incorporated paint to form a white-colored coating.

DESCRIPTION OF THE PREFERRED EMBODIMENTS

The medium-boiling solvents used as the true solvent in the present invention, as previously described, have a boiling point of from 100° C. to less than 150° C., and the high-boiling solvents have a boiling point of 150° C. or more. These true solvents are preferably selected from the group consisting of butyl or isobutyl acetate (b.p. ca. 126° C.), 3-methyl-3-methoxy butyl acetate (b.p. ca. 188° C.), dipropylene glycol methyl ether (b.p. ca. 188° C.), and the like. Other useful true solvents include a mixed solvent consisting of 60% or more of acetic acid ester type solvents such as isobutyl acetate, butyl acetate and the like, having glycol ether type solvents having a high boiling point of 150° C. or more, for example, cellosolve acetate, butyl cellosolve, 3-methyl-3-methoxy butanol, ethylene glycol, t-butyl ether, propylene glycol phenyl ether and the like, added thereto. The true solvents may be used separately or in combination, and are used preferably in an amount of about 70 to about 80% by weight (for medium-boiling solvent) and about 10 to about 15% by weight (for high-boiling solvent) based on a total weight of the washing solution, although the present invention is not restricted to this range.

Preferably, the true solvents used in the present invention have a high flash point of 25° C. or more. For example, 3-methyl-3-methoxy butyl acetate has a flash point of about 73° C., and dipropylene glycol methyl ether about 79° C., and therefore, these solvents substantially have no fire hazard. Note acetone has a flash point of about −9° C., and methyl ethyl Ketone a flash point of about −6° C.

In the washing solution according to the present invention, an assistant solvent and diluent may be optionally used as additional solvent components, if desired. For example, the assistant solvent is preferably selected from conventional assistant solvents such as alcohols, for example, ethyl alcohol, isobutanol and the like. Similarly, the diluent is preferably selected from conventional diluents such as hydrocarbons, for example, Solvesso (aromatic hydrocarbon solvents commercially available from Esso Petroleum Co. and the like. These additional components may be used in an appropriate amount depending upon the desired result and other factors.

The washing solution of the present invention is preferably applied to color-change coating processes in which a non-aqueous dispersion (NAD) paint and a titanium dioxide pigment-containing paint are used in combination, i.e., in sequence. The NAD paint is used to form a clear coating, and the titanium dioxide pigment-containing paint is used to form a white-colored coating. Particularly, the present washing solution is applied to the spray coating after the formation of the clear coating and before the formation of the white-colored coating.

The washing solution can be widely used in various color-change washing processes. Although the types of articles to be washed are not restricted, automobile bodies are most suitable, as they are generally subjected to the color-change coating processes described above.

Figure 1:
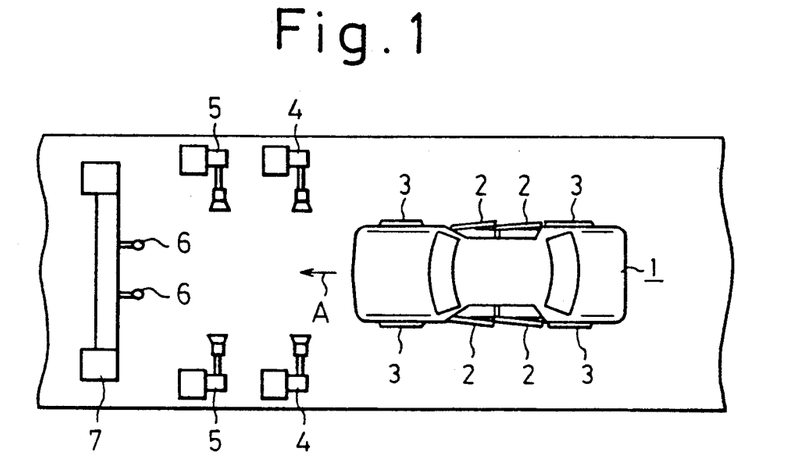
FIG. 1 is a plan view of the side spray coating for use in a rotary type electrostatic spray coating process to which the washing solution and method of the present invention can be applied.

For a further understanding of the present invention, a typical example of the spray coating booth will be described with reference to FIG. 1, which illustrates a rotary-type electrostatic spray coating device for automobile bodies. In the illustrated spray coating booth, automobile bodies 1 (only one body is illustrated in the drawing) each having door portions 2 and protruding portions 3 are continuously conveyed in the direction indicated by an arrow A, and both side portions of the automobile body 1 are spray coated while moving along the conveying line by a pair of low-positioned side spray heads 4 and by a pair of high-positioned side spray heads 5. The body 1 is then guided under a pair of top spray heads 6 installed on a gate-type reciprocator 7, and thus the top portion of the body 1 is spray coated. Although FIG. 1 shows only two pairs of side spray heads, conventionally three pairs of the side spray heads are disposed in the spray coating line to attain a satisfactory paint coating deficiency. In addition, although not illustrated, four pairs of side spray heads are frequently disposed in the spray coating line to further increase the paint coating efficiency and to widen the coating area.

Figure 2:
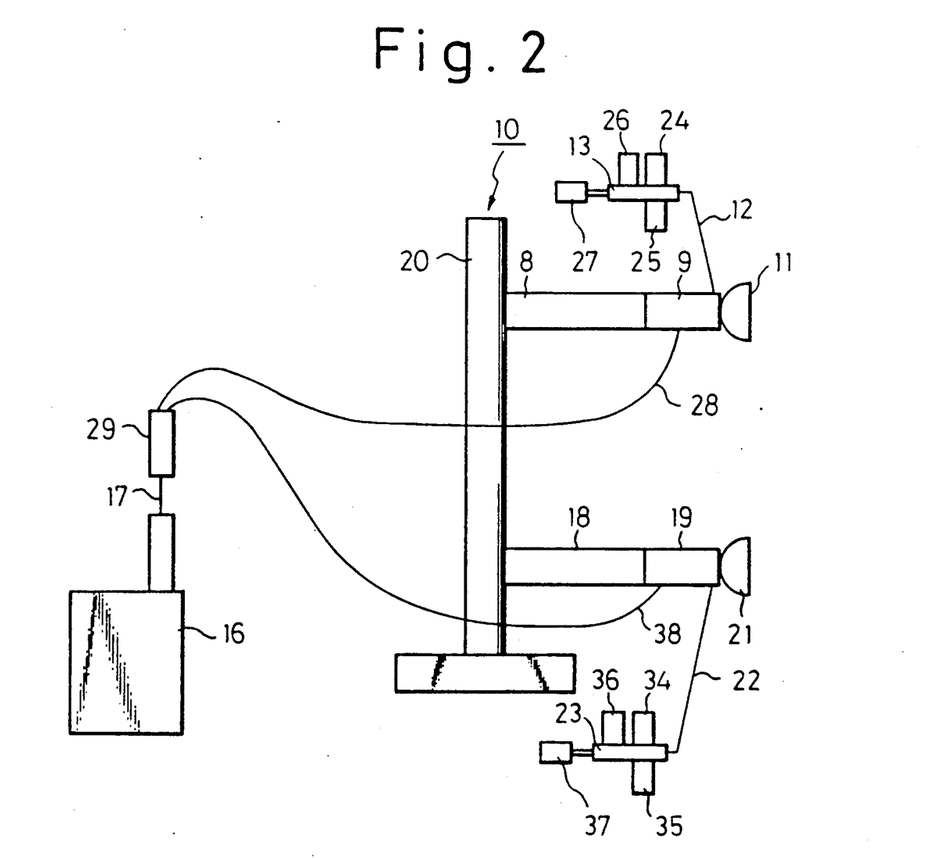
FIG. 2 is a side view of the side spray coating unit used in the spray coating booth.

In the spray coating booth of FIG. 1, two types of side spray heads, i.e., low-positioned side spray heads and high-positioned side spray heads, are installed. but a side spray coating unit illustrated in FIG. 2 can be advantageously used instead of these side spray heads. In the side spray coating unit 10 illustrated in FIG. 2, a reciprocating device 20 has an upper insulating support 8 and lower insulating support 18 fixed thereto, and an air motor 9 capable of rotatably supporting a spray head 11 and an air motor 19 capable of rotatably supporting a spray head 21 are fixed to those supports 8 and 18, respectively. The spray heads 11 and 21 used herein are bell-type. A high voltage generator 16 is connected via a high-voltage cable 12 to a triple connector 29, and one outlet of the triple connector is then connected through a high-voltage cable 28 to the air motor 9, and another outlet of the connector is connected through a high-voltage cable 38 to the air motor 9. A color change unit for the spray head 11 comprises a manifold 13 provided with color-changing valves 24 and 25, each connected to a paint source supplying a different color paint (not shown), a washing thinner valve 26 connected with a thinner source (not shown), and a washing air valve 27 connected with a pressurized air source (not shown). An outlet of the manifold 13 is connected via a paint hose 12 to the spray head 11. Similarly, a color change unit for the spray head 21 comprises a manifold 23 having color-change valves 34 and 35, a thinner valve 36, and an air valve 37 fixed thereto, and an outlet of the manifold 23 is connected via a paint hose 22 to the spring head 21.

The side spray coating unit of FIG. 2 is operated as follows:

When one of articles, such as automobile bodies to be spray coated, which are continuously conveyed along the spray coating line, reaches a predetermined position, a start signal is output to start the rotation of the air motors 9 and 19, and thus of the spray heads 11 and 21, respectively. The spray heads 11 and 21 rotate at a predetermined number of revolutions.

As apparent from the above description, the spray head 11 and related devices are operated simultaneously with the spray head 21 and related devices. Accordingly, hereinafter, the operation of the spray coating unit will be described with reference to the spray head 11 and related devices. When the spray head 11 rotates at a predetermined number of revolutions, the color-change valve 24 for a first color paint is previously opened for a predetermined short time to fill a full length of the paint hose 12 with the first color paint. After the hose 12 is filled with the paint, the high voltage generator 16 is switched ON, and a negative high voltage is applied through the high-voltage cable 17, triple connector 29, and high-voltage cable 28, in sequence, to the air motor 9.

When the negative high voltage is applied to the air motor 9, a coating-start signal is transmitted to open the color-change valve 24, and the first color paint is fed from the paint source (not shown) to the spray head 11, and since the spray head 11 is rotating, spray coating of the work piece with the first color paint is immediately started. This spray coating is continued until the work piece reaches a predetermined position in the spray coating line.

After the spray coating of the first color paint is completed, the color-change valve 24 is closed by a coating-end signal and the operation of the high voltage generator 16 is also stopped.

Thereafter, the manifold 13, paint hose 12 and spray head 11 are washed to remove the first color paint remaining therein.

This washing, i.e., color-change washing, is started by a color-change signal sent to a color change unit. Upon receipt of the color-change signal, the valve for washing solution or a thinner 26 and the pressurized air valve 27 in the color change unit are opened alternately, and the remaining first paint is thus completely removed from the manifold 13, nose 12, and spray head 11.

In the same manner as described above with reference to the color-change valve 24 for the first color paint, the article can be also spray-coated by using a color-change valve 25 for a second color paint, and therefore, the spray coating of the article with the second color paint will not be described herein.

The present invention will be further described with reference to the following working examples.

Figure 3:
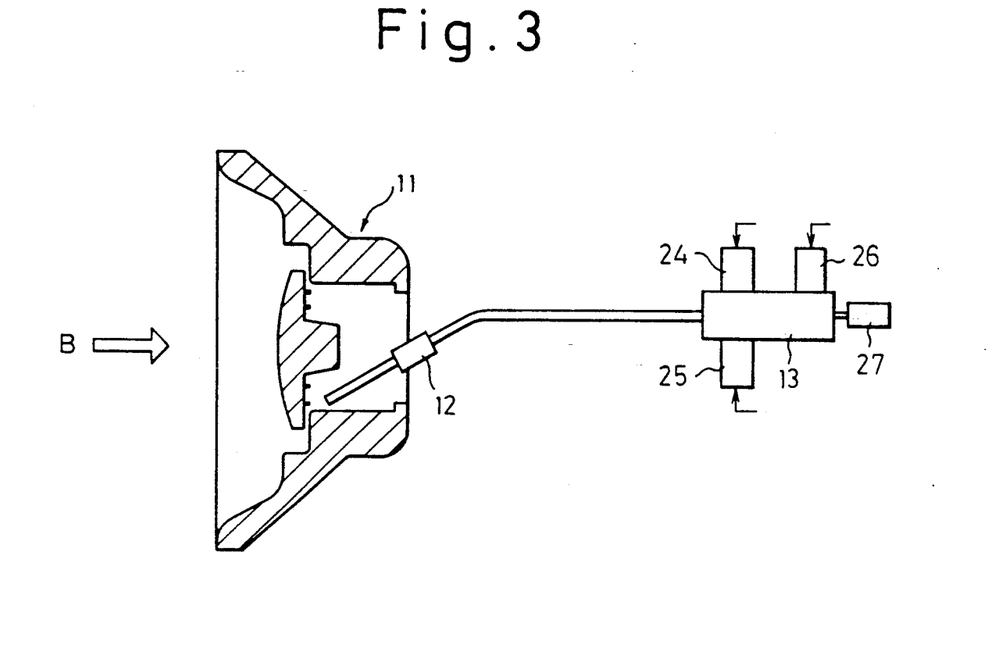
FIG. 3 is a cross-sectional view of the color-change unit and spray head combined therewith of the side spray coating unit of FIG. 2.

In these examples, to evaluate the excellent washing effects of the present invention, a color-change unit and spray head combined therewith, as shown in FIG. 3, were used. As can be seen, the combination of the color-change unit and spray head is substantially the same as that of FIG. 2. Namely, the color-change unit for the spray head 11 comprises a manifold 13 provided with a valve 24 for the NAD paint, a valve 25 for the titanium dioxide pigment-containing paint, a valve 26 for the washing solution or thinner of the present invention, and a valve 27 for the pressurized air. The paint, washing solution, and air are supplied through a hose 12 to the spray head 11.

Figure 4:
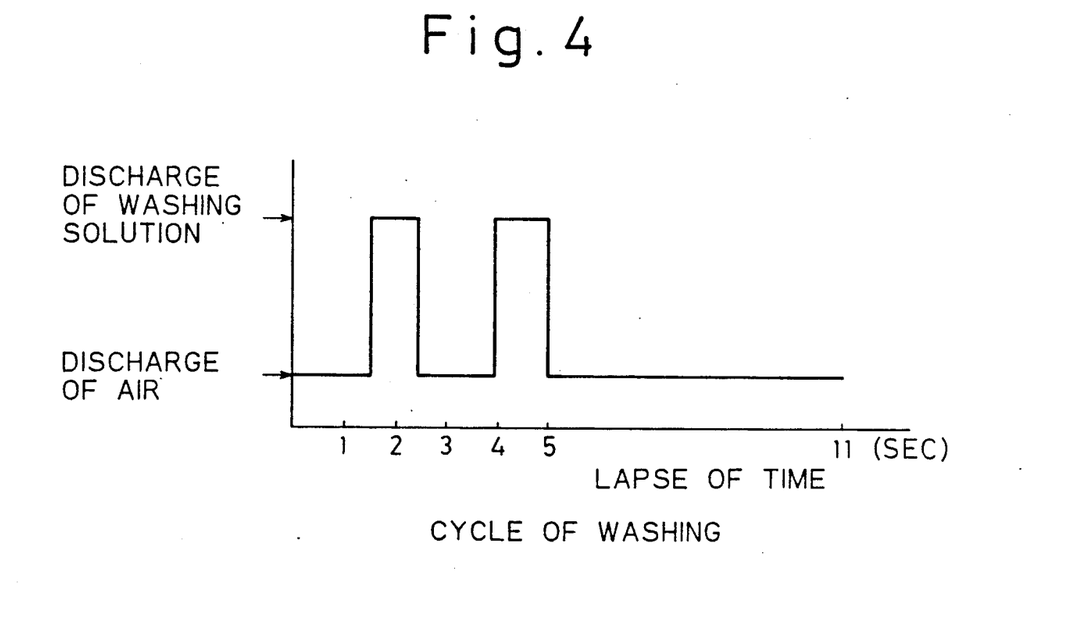
FIG. 4 is a graph of the washing cycles used in the appended examples.

The following coating-washing cycle was repeated (in total, 14 times):
(i) Coating of $TiO_2$ pigment-containing paint
   Spraying time: 5 seconds
   Discharge: 400 ml/min
(ii) Washing
(iii) Coating of NAD paint
   Spraying time: 5 seconds
   Discharge: 400 ml/min
(iv) Washing The washing steps (ii) and (iv) were carried out in accordance with the schedule shown in FIG. 4. Namely, an air discharge for 1.5 seconds at a pressure of 1.0 kg/cm$^2$ and a washing solution discharge for 1.0 second at a discharge rate of 300 ml/min was repeated twice, and then air was discharged for 6 seconds.

The NAD and $TiO_2$ paints used herein were prepared in accordance with the following procedure, although these paints may be prepared in and conventional manner.

Preparation of NAD paint:

To a reaction container, 126 parts of melamine, 412 parts of (40%) butyl formaldehyde, 190 parts of n-butanol and 36 parts of xylene were added and heated. The mixture was reacted for 7 hours, and water distilled from the container was removed with a water separator. Thereafter, the pressure of the container was reduced to remove 100 parts of the distilled liquid. Next, 50 parts of Shellsol 140 (hydrocarbon solvent, commercially available from Shell Petroleum Co) and 50 parts of n-heptane were added to the container to obtain a melamine resin solution having a resin content of 60% and a varnish viscosity J (Gardner's bubble viscosity at 25° C.).

To another reaction container, 58 parts of the melamine resin solution prepared in the above step, 30 parts of n-heptane, and 0.15 parts of benzoyl peroxide were added, and the mixture was heated to 95° C. After heating, the following monomeric mixture was drop-wise added over 3 hours.

| monomeric component | parts |
| --- | --- |
| styrene | 15 |
| acrylonitrile | 9 |
| methyl methacrylate | 13 |
| methyl acrylate | 15 |
| n-butyl methacrylate | 1.8 |
| 2-hydroxyethyl methacrylate | 10 |
| acrylic acid | 1.2 |
| benzoyl peroxide | 0.5 |
| n-butanol | 5 |
| Shellsol 140 (Shell Petroleum Co.) | 30 |
| n-heptane | 9 |

After the addition was completed, the mixture was left to stand for one hour, and thereafter, a mixture of 0.65 parts of t-butyl peroctoate and 3.5 parts of Shellsol 140 was drop-wise added over one hour. The mixture was stirred for 2 hours, while maintaining the temperature at 95° C., the pressure was then reduced to remove 34 parts of the solvents used, and a non-aqueous dispersion of acryl resin having a resin content of 60% and a varnish viscosity A (Gardner's bubble viscosity at 25° C.) was obtained.

After stirring, the non-aqueous dispersion was added to another reaction container provided with a thermometer, a reflux condenser and other equipment, and 40 parts of Cellosolve acetate then added. The mixture was heated with stirring, and when the temperature of the mixture reached 135° C., the following monomeric mixture was added over 3 hours.

| monomeric component | parts |
| --- | --- |
| methyl methacrylate | 10 |
| i-butyl methacrylate | 30 |
| n-butyl methacrylate | 12 |
| 2-ethyl hexyl methacrylate | 20 |
| 2-hydroxy ethyl methacrylate | 25 |
| methacrylic acid | 3 |
| Cellosolve acetate | 50 |
| a,a'-azobisisobutylonitril | 4 |

After the addition of the monomeric mixture, the reaction was continued at 135° C. for one hour, and thereafter, a mixture of 10 parts of Cellosolve acetate and 0.6 parts of a,a,-azobisisobutylonitril was added over one and a half hour, and the reaction was continued for a further 2 hours. After the reaction was completed, cellosolve acetate was distilled off under a reduced pressure to control a resin content to 65%, and thereby obtain a solution of acryl resin. The resulting acryl resin solution had a number-average molecular weight (determined by vapor pressure osmometry) of 6100 with regard to a resin content thereof and a viscosity $Z_2$ (Gardner's bubble viscosity at 25° C.).

Using the solution of acryl resin, a clear paint having the following formulation was prepared by a Disper dispersion method.

| component | parts |
| --- | --- |
| 65% solution of acryl resin | 77 |
| 70% Uban 20 SE-HS | 43 |
| 60% non-aqueous dispersion of acryl resin | 33 |
| 1% Rainbow No. 3 (silicon additive, commercially available from Rainbow Chemical Co.) | 0.1 |

| component | parts |
| --- | --- |
| Chemical Co.) | |

Preparation of $TiO_2$ paint:

100 parts by weight of $TiO_2$ pigments (titanium white, R-701 commercially Teikoku Kako K.K.) were incorporated into 100 parts by weight of a vehicle component which consisted of 75% by weight of coconut oil-modified alkyd resin (oil length: 15%, hedroxyl number: 80, and acid number: 15) and 25% by weight of butyl etherified melamine resin (in a solid ratio). The alkyd resin was prepared by using anhydrous phthalic acid and terephthalic acid as a polybasic acid component, and a $TiO_2$ paint useful as a white-colored paint was obtained.

Example 1

The above-described coating-washing cycles were repeated for a total of 14 times. The washing solution having the following formulation was used for each color-change washing step.

| solvent component | % by weight |
| --- | --- |
| butyl acetate | 70 |
| methyl isobutyl ketone | 10 |
| 3-methyl-3-methoxy butyl acetate (b.p. 188° C.) | x* |
| Solvesso #100 (aromatic hydrocarbon solvent, commercially available from Esso Petroleum Co.) | 7.5 |
| methyl ethyl ketone (b.p. 79.6° C.) | 12.5-x* |

The variable x* was 0, 5, 7.5, 10 and 12.5% by weight. A flash point of the washing solution was 17.5° C. (for x=5), 19° C. (for x=7.5), 22.5° C. (for x=10) and 27° C. (for x=12.5).

Figure 5:
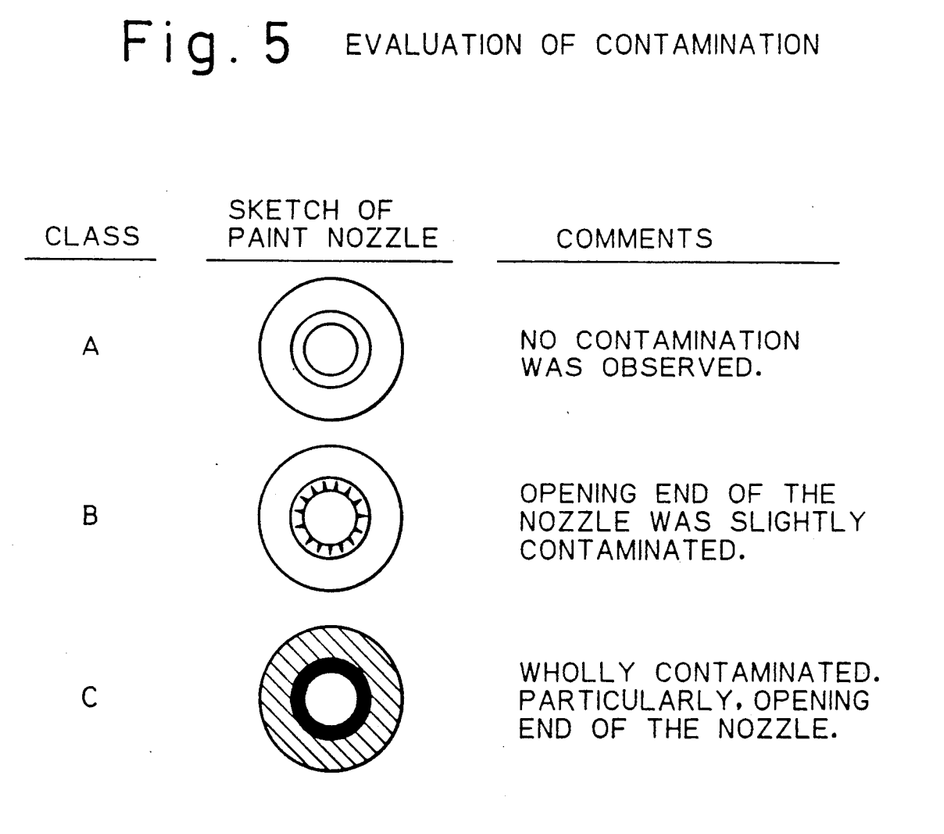
FIG. 5 is a table illustrating the standards for the evaluation of contamination.
Figure 6:
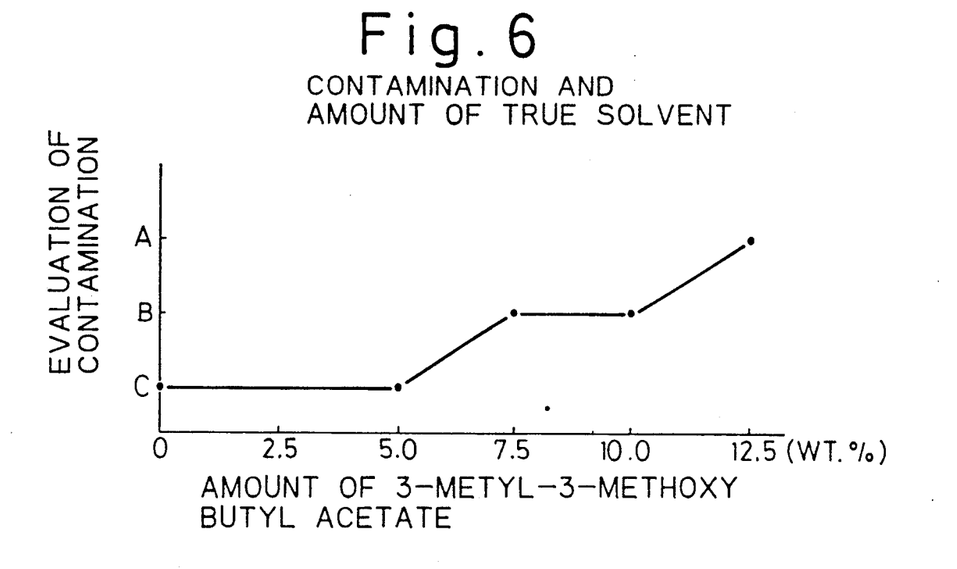
FIG. 6 is a graph showing the relationship between the contamination and the amount of 3-methyl-3-methoxy butyl acetate used as the true solvent; and, FIG. 7 is a graph showing the relationship between the contamination and the amount of dipropylene glycol methyl ether used as the true solvent.

After the series of coating-washing cycles, contamination of the coating device was evaluated with reference to the classification table of FIG. 5. The sketch of the paint nozzle in FIG. 5 was reproduced from the observation of the spray head of FIG. 3 from a view point indicated by an arrow B. The results of the contamination evaluation are plotted in FIG. 6, which shows that contamination is reduced with an increase of the amount of 3-methyl-3-methoxy butyl acetate added.

Example 2

The procedure of Example 1 was repeated except that the washing solution having the following formulation was used for each color-change washing step.

| solvent component | % by weight |
| --- | --- |
| butyl acetate | 70 |
| Solvesso #100 | 7.5 |
| dipropylene glycol methyl ether (b.p. 180° C.) | y** |
| methyl ethyl ketone (b.p. 79.6° C.) | 12.5-y** |

Figure 7:
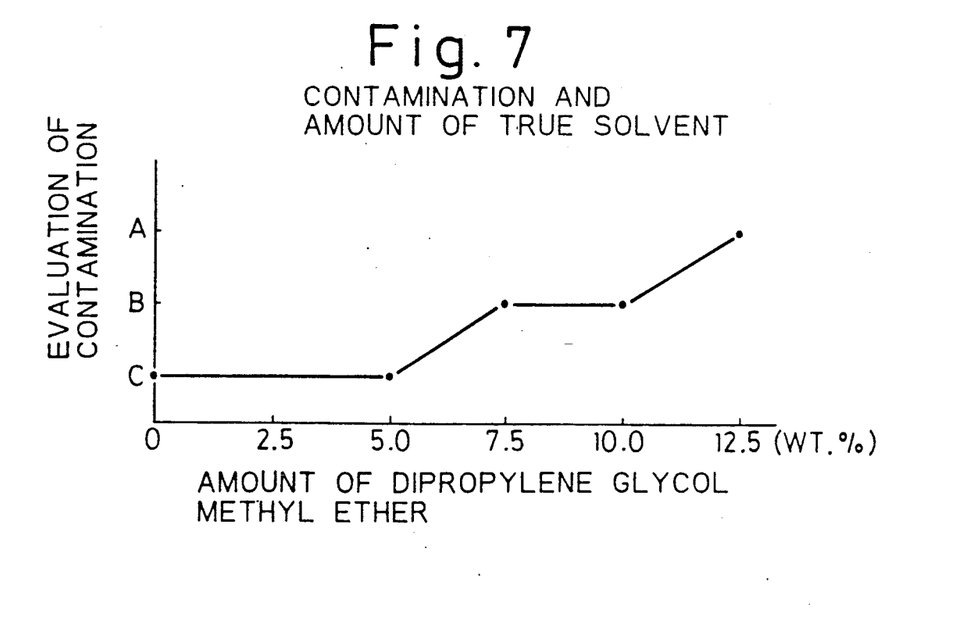

The variable y** was 0, 5, 7.5, 10 and 12.5% by weight A flash point of the washing solution was 19.5° C. (for y=5), 21.5° C. (for y=7.5), 23° C. (for y =10) and 29.5° C. (for y=12.5). The results of the contamination evaluation are plotted in FIG. 7, which shows that the contamination is reduced with an increase of the amount of dipropylene glycolmethyl ether added.

As apparent from the above description, since the contamination and clogging of the coating device can be notably reduced according to the present invention, cleaning operations in the coating device and related parts which were essential to the prior art color-change coating can be omitted or simplified, and the life expectancy of the coating device including the spray head thereof can be extended. Further, since the coating device can operate at full power, the quality of the resulting coating is improved. Furthermore, since the true solvents used in the present invention have a high flash point of 25° C. or more, the fire hazard can be remarkably lowered.

We claim:

1. A washing solution for a color-change washing in a rotary type electrostatic spray coating device in which a non-aqueous dispersion paint and a titanium dioxide pigment-incorporated paint are used in combination for a color-change painting, which solution consists essentially of 70 to 80% by weight of a medium boiling true solvent and, optionally, 10 to 15% by weight of a high boiling true solvent, each % by weight based on the total weight of the washing solution, and wherein said medium boiling true solvent is selected form the group consisting of butyl acetate and isobutyl acetate and said high boiling true solvent, if present, is selected from the group consisting of 3-methyl-methoxy butyl acetate and dipropylene glycol methyl ether the balance being solvents selected from the group consisting of alcohols, aromatic hydrocarbons, ketones and mixtures thereof.

* * * * *

UNITED STATES PATENT AND TRADEMARK OFFICE
CERTIFICATE OF CORRECTION

PATENT NO. : 5,045,224
DATED : September 3, 1991
INVENTOR(S) : Ikuo WATANABE ET AL.

It is certified that error appears in the above-identified patent and that said Letters Patent is hereby corrected as shown below:

Title Page, Title, after "SOLUTION" delete ",".

Claim 1, column 10, line 9, change "form" to --from--.

Signed and Sealed this

Fourth Day of May, 1993

Attest:

MICHAEL K. KIRK

Attesting Officer

Acting Commissioner of Patents and Trademarks